(12) United States Patent
Lam

(10) Patent No.: US 10,272,713 B2
(45) Date of Patent: Apr. 30, 2019

(54) MAGNETIC PIN FOR HOLDING PAPER ONTO A FERROMAGNETIC SURFACE

(71) Applicant: Wai Chun Lam, Elmhurst, NY (US)

(72) Inventor: Wai Chun Lam, Elmhurst, NY (US)

( * ) Notice: Subject to any disclaimer, the term of this patent is extended or adjusted under 35 U.S.C. 154(b) by 0 days.

(21) Appl. No.: 15/404,160

(22) Filed: Jan. 11, 2017

(65) Prior Publication Data

US 2018/0194159 A1    Jul. 12, 2018

(51) Int. Cl.
*B42F 5/00* (2006.01)
*F16B 1/00* (2006.01)

(52) U.S. Cl.
CPC ........ *B42F 5/00* (2013.01); *F16B 2001/0035* (2013.01)

(58) Field of Classification Search
CPC .............................. Y10T 24/1959; Y10T 24/32
USPC ............. 24/66.1, 303; 248/683, 206.5, 309.4
See application file for complete search history.

(56) References Cited

U.S. PATENT DOCUMENTS

| | | | | |
|---|---|---|---|---|
| 2,557,399 A * | 6/1951 | Teetor | ........................ | G09F 1/14 116/63 P |
| 3,041,697 A * | 7/1962 | Budreck | .............. | A44B 15/002 24/303 |
| 3,111,736 A * | 11/1963 | Budreck | .............. | A44B 15/002 24/303 |
| 6,477,749 B1 * | 11/2002 | Reiter | ..................... | A41F 1/002 24/303 |
| 6,775,935 B1 * | 8/2004 | Cohen | ....................... | G09F 7/04 40/600 |
| 7,331,133 B2 * | 2/2008 | Bauernfeind | .......... | B62D 41/00 40/600 |
| 7,640,636 B2 * | 1/2010 | Clark | ................. | A44C 17/0216 24/303 |
| 8,464,377 B1 * | 6/2013 | Carson | ..................... | A47G 9/02 24/303 |
| 2004/0021052 A1 * | 2/2004 | Dagan | ..................... | A47G 1/17 248/441.1 |
| 2008/0005873 A1 * | 1/2008 | Barton | .................. | B43M 15/00 24/303 |

* cited by examiner

Primary Examiner — Joshua T Kennedy

(57) ABSTRACT

This device is composed of two pins. Each pin is made of plastic and a piece of magnetic that has opposite magnetic polarity facing each other. The pin can be used as a single unit where it can hold stationery such as papers, envelopes or small pamphlet to a ferromagnetic surface such as metal office cabinet, metal chalk board, refrigerator door or anywhere ferromagnetic surface exist. When used as one single unit the paper or stationery have some degree of rotational freedom and will self-center itself with the heaviest side down. It can also be attached to a center of a personal business card or credit card and be spun like a top vertically, horizontally or upside down on a ferromagnetic surface. However, when used as two individual pin to attach the stationery to a ferromagnetic surface such as metal office cabinet, metal chalk board, refrigerator door or anywhere ferromagnetic surface exist the stationeries will have no degree of rotational freedom and it will be fixed into position.

1 Claim, 5 Drawing Sheets

MAGNETIC PIN FOR HOLDING PAPER ONTO A FERROMAGNETIC SURFACE

BACKGROUND OF THE INVENTION

A magnetic pin device used for holding paper or stationary onto a ferromagnetic surface is made of two pins. The major difference between this device to other pins that are in the market today is that this device does not make holes in the paper or stationery or pamphlets that it is holding. In addition, it does not make holes onto the surface that it is attached to. The device holds the paper through friction and magnetic holds onto the paper or the stationery that it is holding or the metal surface that it is attached to. This is the major difference and advantage that this device has over most other products that is in the market today. In addition, with this device a user can hold or remove the stationary to and from a metal surface with one hand.

BRIEF SUMMARY OF THE INVENTION

Each pin comprises a top member and a bottom member, each of which is made of plastic and houses a magnet as illustrated in FIG. 1. The magnet in each member is placed so that the poles facing each other are of the opposite polarity (such as north faces south or south faces north) as shown in FIG. 1. The two pin members can be used as a single unit, as illustrated in FIGS. 2A and 2B or in FIGS. 3A and 3B. The pin members can be used as two individual pins as illustrated in FIGS. 4A and 4B. When the pins are used as illustrated in FIGS. 4A and 4B, the paper will be fixed and cannot rotate freely or self-center. In addition, the removal of the pin will best be done with two hands so that the paper will not fall to the ground.

However, there is another arrangement of the pin so that it will only require the usage of one hand to remove the paper, as Illustrated in FIGS. 5A and 5B. This required requires the usage of two sets of pins together to have the paper held in a fixed position. The advantage of holding the stationary as illustrated in FIGS. 5A and 5B as to FIGS. 4A and 4B is that one can remove the paper in FIGS. 5A and 5B with one hand without worrying that the paper will fall to the floor.

DETAILED DESCRIPTION OF THE INVENTION

Figure 1:
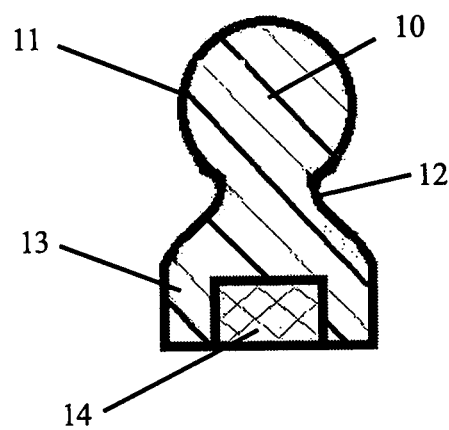
FIG. 1 shows a preferred embodiment of the magnetic pin device
Figure 1:
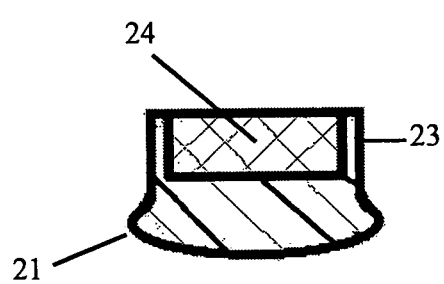
Figure 2A:
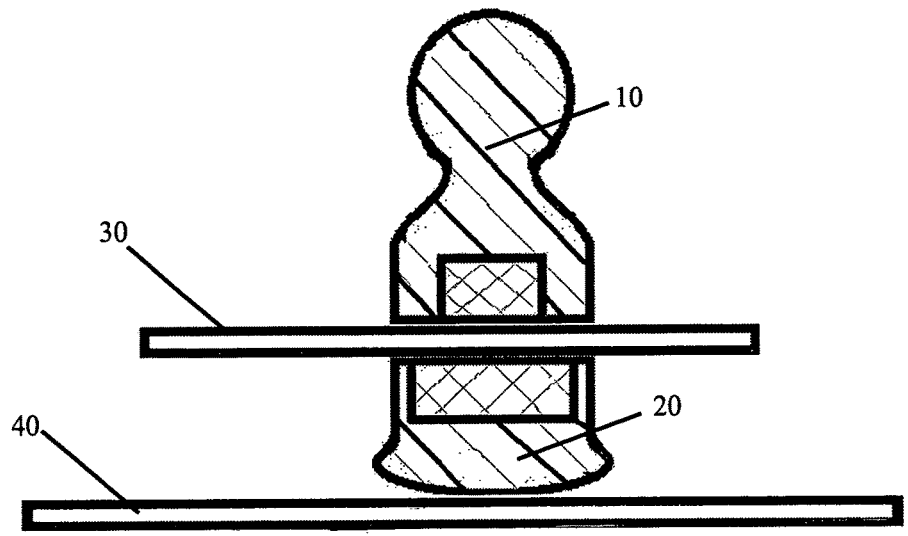
FIG. 2A shows a side view of a magnetic pin rotatably holding a sheet of paper on a ferromagnetic surface
Figure 2B:
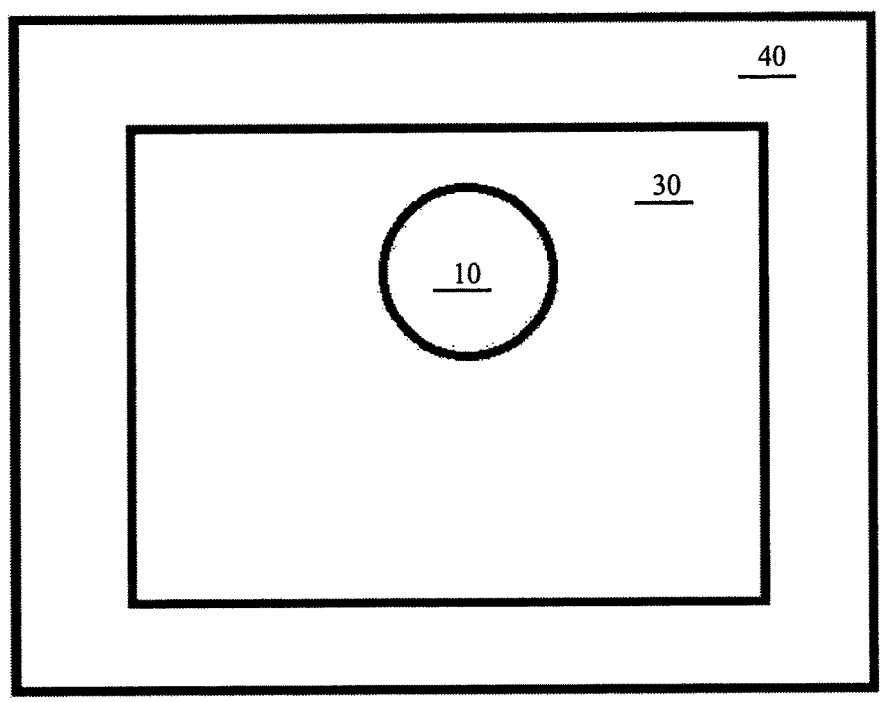
FIG. 2B shows a top view of a magnetic pin rotatably holding a sheet of paper on a ferromagnetic surface
Figure 3A:
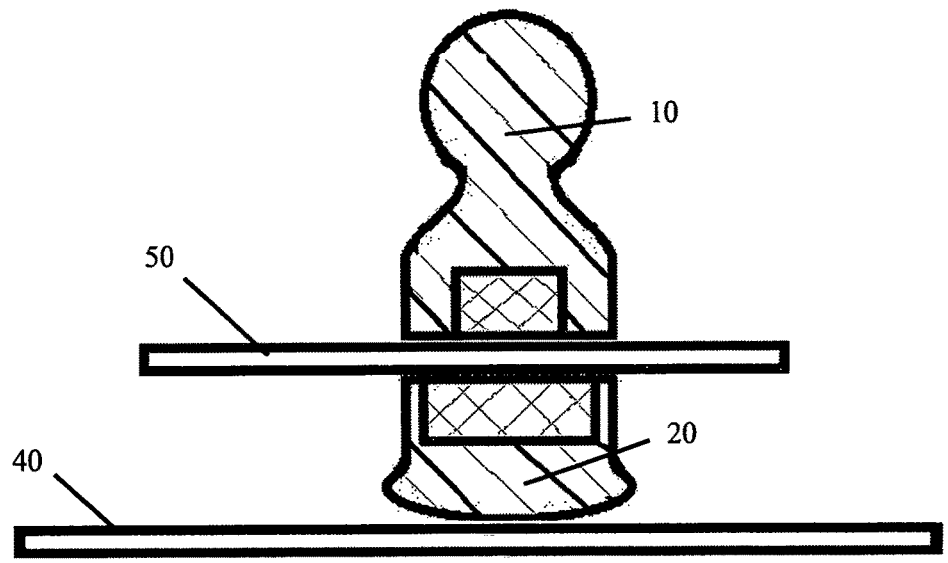
FIG. 3A shows a side view of a magnetic pin rotatably holding a business card on a ferromagnetic surface
Figure 3B:
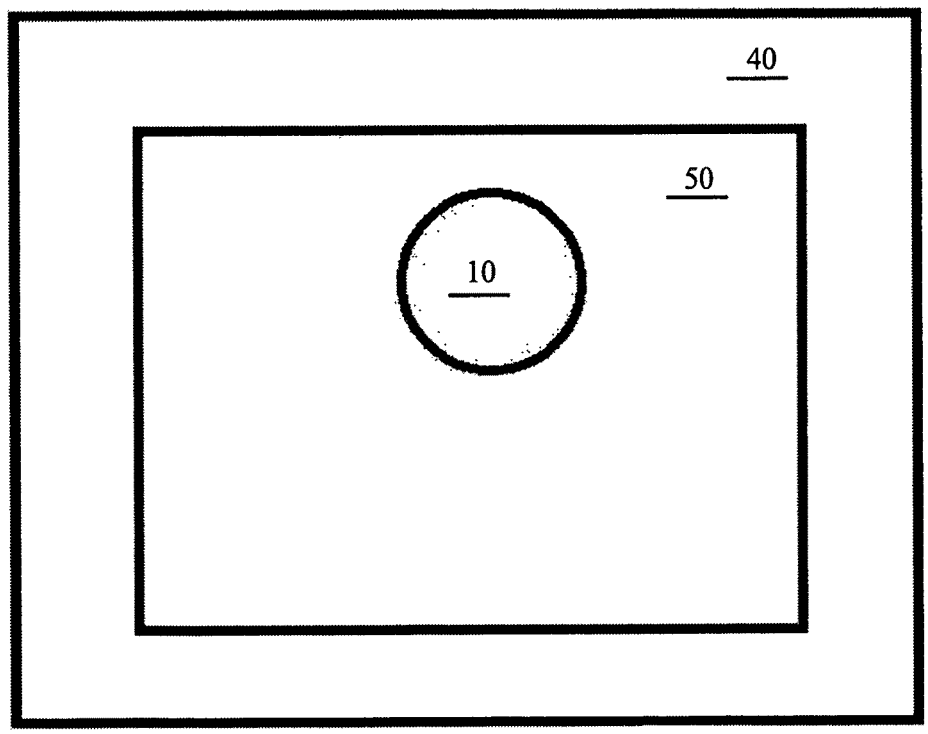
FIG. 3B shows a top view of a magnetic pin rotatably holding a business card on a ferromagnetic surface

A magnetic pin for holding paper onto a ferromagnetic surface (Flying Pin). This device is composed of a top pin member (10) and a bottom pin member (20).

The top pin member is constructed of a solid plastic material and has cylindrical body portion having a planar lower face defining a socket extending from the planar lower face in which a first magnet (14) is fixedly seated such that a magnet surface of said first magnet is coplanar with the planar lower face. The top pin further has an elongated grip portion defined by a neck (12) and head (11) portion extending from said cylindrical body portion (13).

The bottom pin member is constructed of a solid plastic material and has a cylindrical body portion having a planar upper face defining a socket extending from the planar upper face in which a second magnet (24) is fixedly seated such that a magnet surface of said second magnet is coplanar with the planar upper face. The bottom pin further having a bulbous grip portion (21) extending radially from said cylindrical body portion and terminating in a convex face.

The device can be used as a single unit where top and bottom pins hold stationery such as papers (30), envelopes or small pamphlets to a ferromagnetic surface (40), such as metal office cabinet, metal chalk board, refrigerator door or anywhere ferromagnetic surfaces exist (FIGS. 2A-3B). When used as a single unit, the device will have some degree of rotational freedom and will self-center itself with the heaviest side of the bottom pin down. It can also be attached to a center of a personal business card or credit card and can be spun it like a top vertically, horizontally, or upside down on a ferromagnetic surface.

Figure 4A:
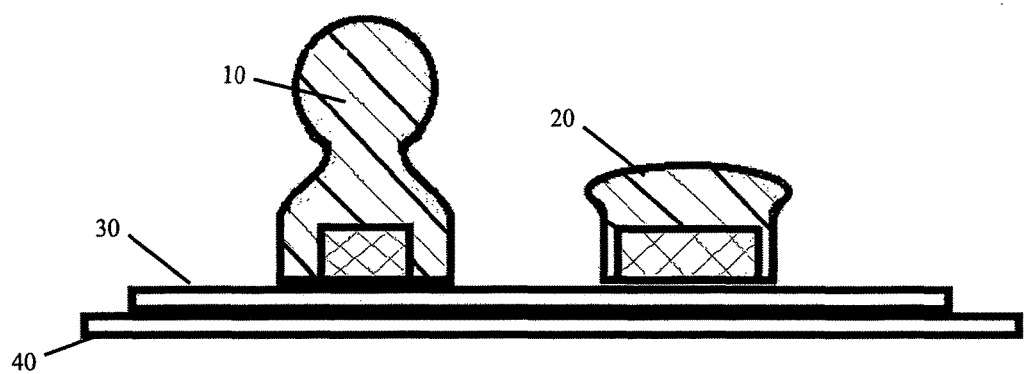
FIG. 4A shows a side view of a magnetic pin statically holding a sheet of paper on a ferromagnetic surface
Figure 4B:
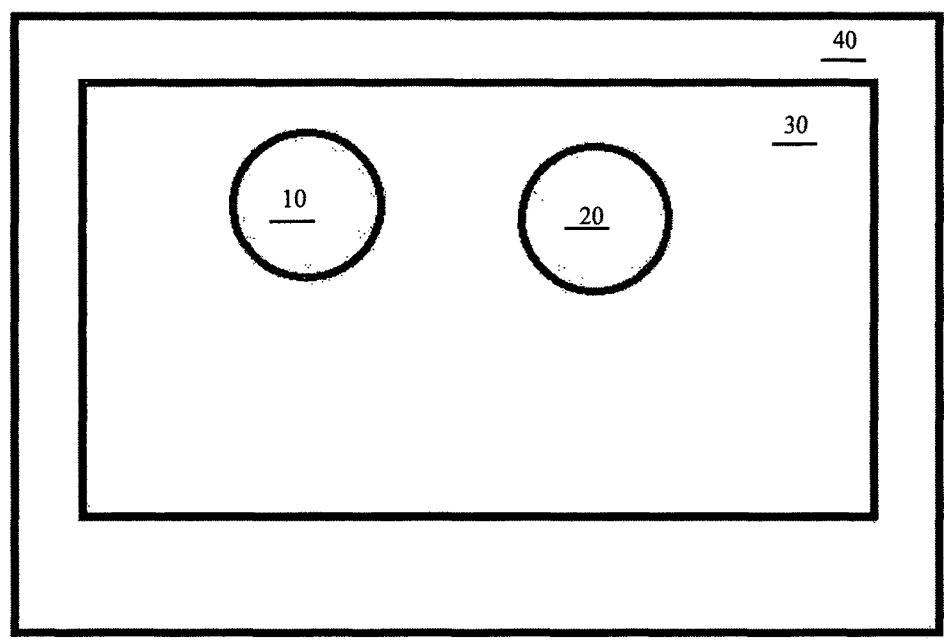
FIG. 4B shows a top view of a magnetic pin statically holding a sheet of paper on a ferromagnetic surface
Figure 5A:
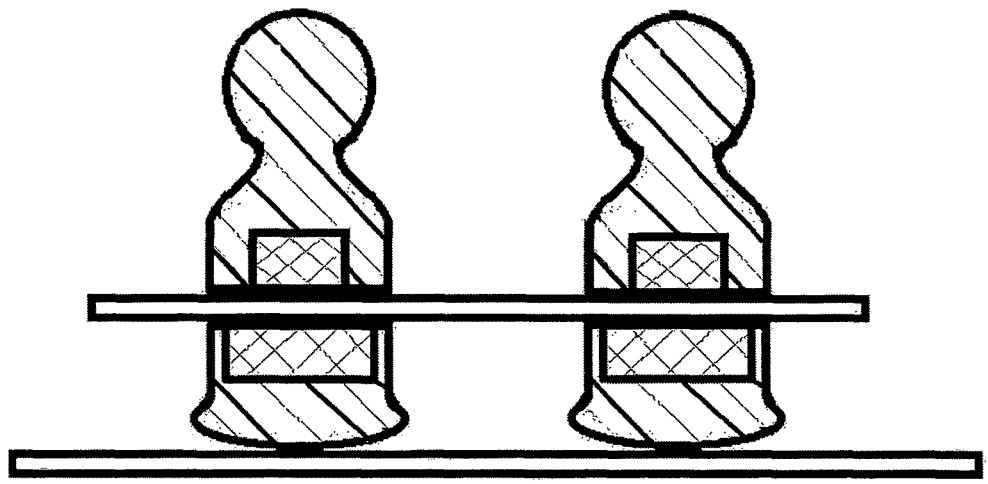
FIG. 5A shows a side view of two magnetic pins holding a sheet of paper on a ferromagnetic surface
Figure 5B:
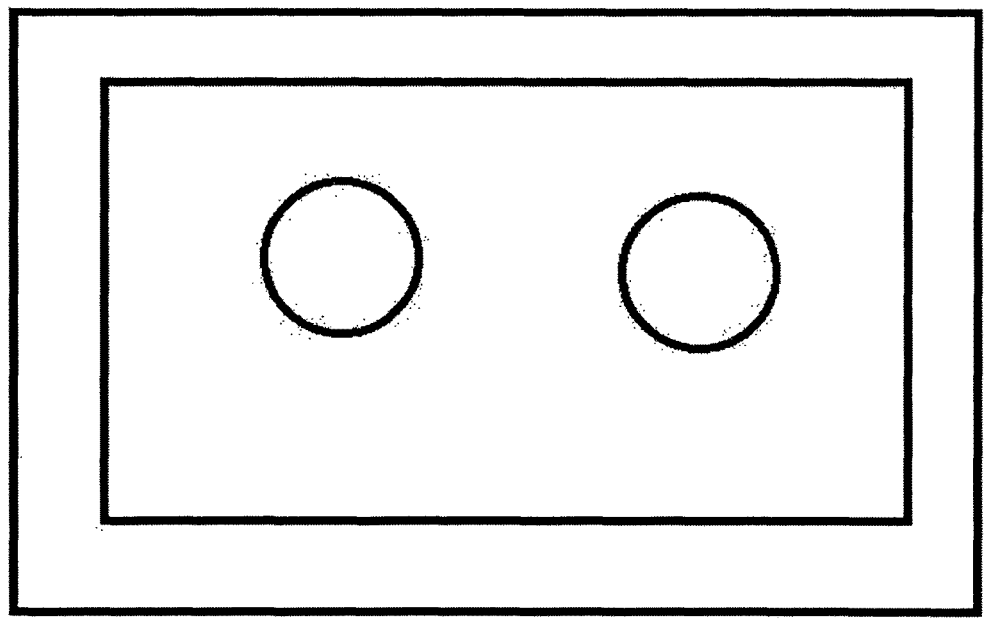
FIG. 5B shows a top view of two magnetic pins holding a sheet of paper on a ferromagnetic surface

The device can also be used as two individual pins to attach the stationery to a ferromagnetic surface, such as a metal office cabinet, metal chalk board, refrigerator door or anywhere ferromagnetic surfaces exist. In this arrangement, the stationery will have no degree of rotational freedom and it will be fixed into the position in which it was placed (FIGS. 4A-4B). In addition, it can be used as a set of two pins to attach a piece of paper onto a ferromagnetic surface. In this arrangement, the paper will have no degree of freedom and offers the advantage of being able to be removed or place with one hand onto a ferromagnetic surface. The magnetic pin holds the paper or stationery or pamphlet through friction and magnetic power and the papers or stationery or pamphlet that it is holding. In addition, it does not make holes onto the surface that it is attached to. Another advantage of the magnetic pin allows the user to remove the paper or stationery or pamphlet with one hand without have the stationary or the pin to fall onto the floor (FIGS. 5A-5B).

The invention claimed is:

1. A magnetic device for holding sheet material, comprising:

a pair of pin members configured to be used as a single unit or separately to hold sheet material there between to a ferromagnetic surface; said pair of pin members comprising a top and bottom pin member;

said top pin member being constructed of a solid material and having cylindrical body portion having a planar lower face defining a socket extending from the planar lower face in which a first magnet is fixedly seated such that a magnet surface of said first magnet is coplanar with the planar lower face; said top pin further having an elongated grip portion defined by a neck and head portion extending from said cylindrical body portion;

said bottom pin member being constructed of a solid material and having cylindrical body portion having a planar upper face defining a socket extending from the planar upper face in which a second magnet is fixedly seated such that a magnet surface of said second magnet is coplanar with the planar upper face; said bottom pin further having an bulbous grip portion extending radially from said cylindrical body portion and terminating in a convex face;

wherein when employed as a single unit, the top and bottom pin members are magnetically connected to one another and, concurrently, the convex face of the bottom pin member is configured to be magnetically connected to a ferromagnetic surface having any orientation while maintaining rotational freedom of the device thereon; and wherein when employed separately the planar surfaces of the top and bottom pin members are configured to statically secure sheet material to a ferromagnetic surface.

* * * * *